United States Patent [19]

Needham et al.

[11] 4,095,920

[45] Jun. 20, 1978

[54] PUMP CONTROL

[75] Inventors: Lyle L. Needham, Bellwood; Bruno J. Marusarz, Chicago, both of Ill.

[73] Assignee: Babson Bros. Co., Oak Brook, Ill.

[21] Appl. No.: 611,177

[22] Filed: Sep. 8, 1975

[51] Int. Cl.² .......................... A01J 5/00; F04B 49/06; G05D 9/12
[52] U.S. Cl. .................................. 417/12; 137/240; 137/392; 307/118; 417/36
[58] Field of Search ............... 137/392, 395; 307/118; 317/DIG. 3; 119/14.08, 14.43; 417/12, 138, 36; 73/304 R

[56] References Cited

U.S. PATENT DOCUMENTS

| | | | |
|---|---|---|---|
| 3,477,460 | 11/1969 | Dotto | 137/392 |
| 3,537,472 | 11/1970 | Yulio | 137/396 X |
| 3,602,251 | 8/1971 | Hill | 137/392 |
| 3,787,733 | 1/1974 | Peters | 307/118 |

Primary Examiner—Martin P. Schwadron
Assistant Examiner—Richard Gerard
Attorney, Agent, or Firm—Wegner, Stellman, McCord, Wiles & Wood

[57] ABSTRACT

A pump control for a pipeline milking system in which milk collects in a receiver and is pumped out periodically. The control has a liquid level sensing circuit connected with an electrode in the receiver. The sensing circuit includes a transistor amplifier, a source of alternating signal, a circuit connecting the source through the electrode and liquid with the base of the transistor and a sensitivity resistor connected in shunt with the transistor base. A timer actuated by conduction of the transistor controls the pump operation. The circuit has provision for control of the pump operation during washing with a switch selecting the milk or wash control electrode and selecting the appropriate time period for the timer.

8 Claims, 3 Drawing Figures

PUMP CONTROL

This invention relates to a circuit for sensing the presence of liquid in a receiver, for a control of a pump in accordance therewith. More particularly, the circuit is intended for use in control of the pump which removes milk from an intermediate milk receiver in a pipeline milking system.

In a typical pipeline milking system, milk flows through a pipeline from the milker units to an evacuated intermediate receiver. The milk partially fills the receiver and is pumped out by a periodically operating pump, to a refrigerated holding tank. Such systems are commonly washed by circulating suitable washing solutions through the pipeline, receiver and other equipment. The washing solution preferably fills or overflows the receiver before the pump is actuated. Liquid level sensors used in previous pump controls have been difficult to adjust for proper sensitivity. Problems are encountered with sensing foam or actuation by a liquid film on the inner surface of the receiver. Different time periods are required during milk and wash operation; and with different sizes of receivers. These variable factors have resulted in the need for several different models of control timers, adding to the cost of manufacturing and distributing the product. The controls are often difficult to adjust initially and require frequent readjustment and service.

The liquid level sensing circuit and pump control disclosed and claimed herein has an improved reliable sensing circuit with a sensitivity control and affords ready selection between milk and wash operating conditions.

One feature of the invention is that the liquid level sensing circuit includes a transistor amplifier having an emitter collector output circuit and a base control element. A circuit connected to an alternating signal source through the level sensing electrode and liquid in the receiver provides a signal which causes the transistor amplifier to conduct. More particularly, a diode connected with the base circuit of the transistor rectifies the alternating current signal from the electrode, applying half wave pulses to the transistor.

Another feature is that a capacitor is connected in series with the electrode circuit and is charged with the half wave pulses, and a sensitivity resistor is connected in shunt therewith, discharging the capacitor, establishing the desired sensitivity operating condition.

Still another feature is that a transistor switch is connected with the transistor amplifier and in turn controls the operation of the pump.

A further feature of the invention is the provision of a pump timer usable selectively for milking or washing and having a milk-wash selector switch with one section which connects the milk or wash electrode with the sensing input of the sensing circuit and a second section connected with the pump timer for selecting the appropriate time period.

Further features and advantages of the invention will readily be apparent from the following specification and from the drawings, in which.

The electrical resistance of milk is relatively uniform regardless of the breed or diet of the cow. Accordingly, reliable sensing of milk is not difficult. The water used for rinsing and washing a cleaned-in-place pipeline varies widely in resistance depending on its content of minerals and other impurities and presents a problem in the design of the liquid sensor as it must be capable of operation under quite different conditions. Moreover, the optimum pump operating time differs not only between milking and washing functions, but with the size of the milk receiver and other physical characteristics of the pipeline system.

It is desirable that the liquid sensor and pump control accommodate these differences in operation. However, it is also important that a pump control, once installed and adjusted, need little or no adjustment by the operator. These considerations have resulted in the design and manufacture of a multiplicity of models of pump controls to accommodate different operating conditions. The control disclosed and claimed herein provides for adjustment of sensitivity, independent setting of pump operating time for milking and washing and convenient selection between milking and washing functions.

Figure 1:
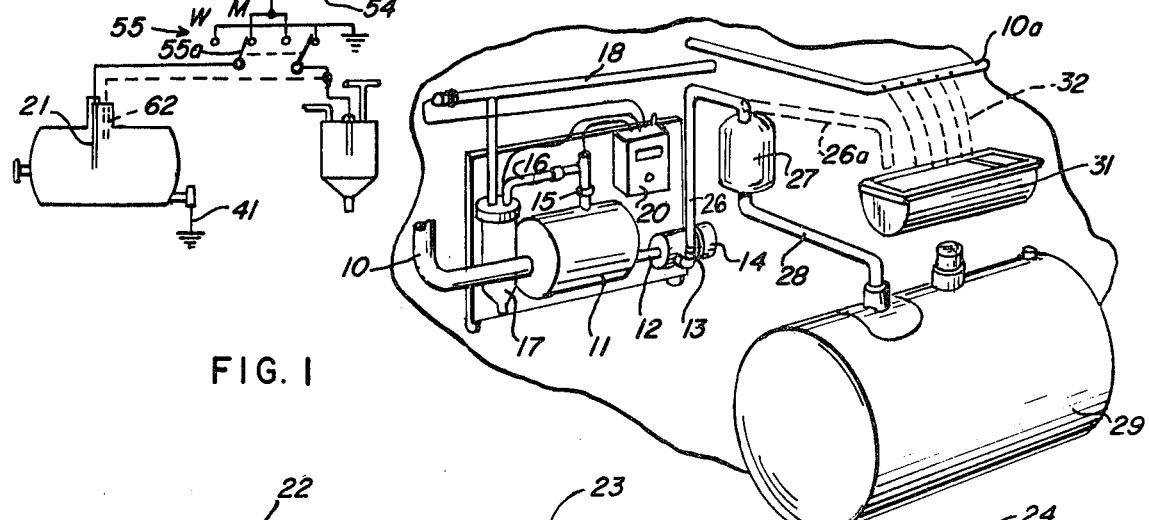
FIG. 1 is a diagram of a milk receiver and pump with which the control is used.

FIG. 1 illustrates that portion of the milking system which is pertinent to the pump and control. A milk pipeline 10 extends through the milking area, as a milking parlor (not shown) and delivers milk from milking units to an intermediate milk receiver 11. The remote end 10a of the milk pipeline is closed during milking. The milk receiver 11 has a milk outlet 12 connected with the inlet of milk pump 13 driven by electric motor 14. An integral electrode housing 15 extends upwardly from the top of receiver 11 and is connected through lateral tube 16 with a liquid trap 17. A source of vacuum (not shown) is connected through vacuum line 18 with trap 17. Liquid sensing electrodes in the housing 15 and trap 17 are connected with the sensing circuitry and pump control in housing 20.

Figure 2:
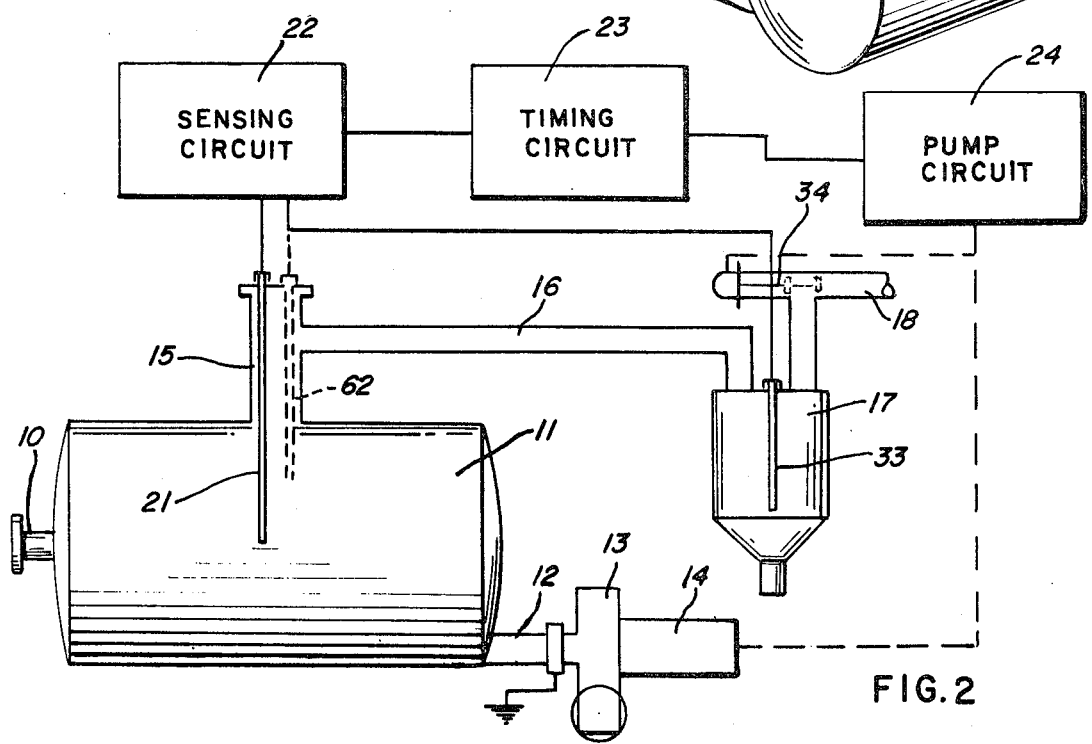
FIG. 2 is a block diagram of the control.

During the milking operation the milk collects in receiver 11 until it reaches the lower end of sensing electrode 21, FIG. 2. The presence of the milk is detected by sensing circuit 22 which actuates timing circuit 23 to operate pump control 24. Milk is pumped from receiver 11 through pipe 26 to a temporary storage chamber 27 from which it drains by gravity through a filter (not shown) in pipe 28 to a bulk storage tank 29. Further details of the filtering system may be found in Merritt et al U.S. Pat. No. 3,139,857. Pump 13 will typically operate several times a minute, for periods of the order of 5 or 10 seconds.

When the milking operation is completed, the system is cleaned by circulating rinse and washing solutions through the pipeline 10 and associated apparatus. A washing solution prepared in wash tank 31 is drawn into the end 10a of the pipeline through hoses 32 shown in broken lines in FIG. 1, which hang down into the wash tank. The output of pump 13 is directed to wash tank 31 through pipe 26a. As during the milking operation, the washing solution is drawn through the pipeline 10 into receiver 11. However, it is preferable that the washing solution completely fill receiver 11, and overflow through line 16 to trap 17 so that all surfaces on which milk may splash are washed. Accordingly, liquid sensing is performed during the washing operation by electrode 33 in the trap.

Trap 17 is self-draining. During the washing operation a vacuum valve 34 between the trap and vacuum line 18 is operated with pump motor 14 so that the vacuum in the trap is interrupted while the motor is energized. This insures that the trap and pipe 16 empty on each cycling of the pump, resulting in more effective washing than if they merely stand with water in them.

Figure 3:
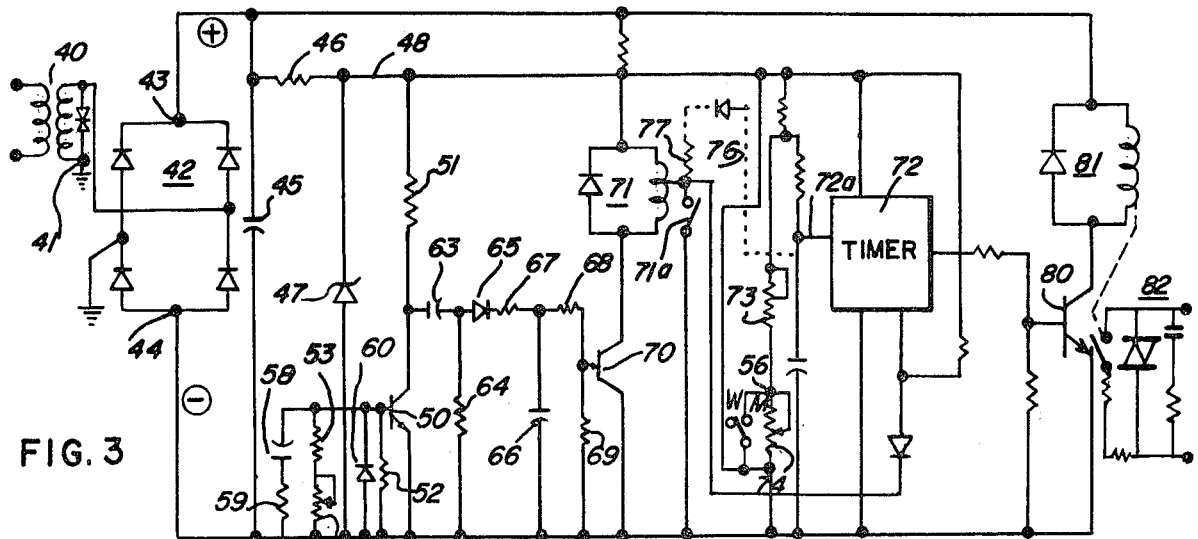
FIG. 3 is a schematic diagram of the level sensing and control circuit.

Details of a preferred sensing circuit are illustrated in FIG. 3. In the course of the description of the circuit, values and type identifications will be given for many of the circuit components. It will be understood that this specific information is given for the purpose of disclosing the best mode contemplated for carrying out the invention. Changes and modifications will be apparent to those skilled in the art.

The circuit is powered from an AC source to which the primary winding of transformer 40 is connected. The secondary winding of the transformer has one terminal returned to a reference potential or ground 41 and a diode bridge, full wave rectifier 42 is connected across the secondary winding. The diode bridge has a positive terminal 43 and a negative terminal 44 across which the sensing and timing circuitry are connected. A filter capacitor 45 is connected across the output of the diode bridge. Series resistor 46 and shunt connected Zener diode 47 provide a stable operating potential of 12 volts on the positive bus 48 with respect to the negative terminal.

A transistor amplifier 50, 2N5172, has its emitter collector circuit connected across the DC supply through a collector load resistor 51, 1000 ohms. The emitter is returned directly to the negative terminal 44. The base element of transistor 50 is returned to the negative terminal through resistor 52 4700 ohms, and through a shunt connected sensitivity resistor circuit including a fixed resistor 53, 10 ohms, and a potentiometer 54, 1000 ohms.

A milk-wash selector switch has one position 55 through which the appropriate sensing electrode is connected with amplifier 50, and a second section 56 in the timer circuit, which will be discussed below. The base element of transistor 50 is connected through capacitor 58, 10 μf, series current limiting resistor 59, 100 ohms, and switch contact 55a with milk sensing electrode 21. Receiver 11, which may be of stainless steel, is connected to ground 41.

When the milk level reaches the end of electrode 21, a circuit is completed through the milk, connecting resistor 59, capacitor 58 and diode 60 in series across one section of bridge rectifier 42. Bridge rectifier 42 is provided with an AC voltage of the order of 30 volts. Half wave pulses charge capacitor 58 causing transistor 50 to conduct. The charge on capacitor 58 dissipates rapidly through resistors 53, 54, the circuit having a time constant much less than the period of the half wave pulses. Conduction of transistor 50 is detected in its output circuit, as will be discussed.

Sensitivity resistor 54 is preferably adjusted with rinse water in the system, the condition most difficult to detect. Where the water is highly conductive, the circuit sensitivity need not be great and resistor 54 has a minimum value. This reduces the likelihood of the circuit responding to milk foam or stray currents through liquid on the inner surface of receiver 11. Where, however, the water is relatively nonconductive, a condition difficult to sense, the maximum resistance is used and the sensing circuit has its maximum sensitivity.

With a glass receiver 11, or conditions which make it difficult or undesirable to ground the receiver itself, a second electrode 62 may be installed in the receiver instead of the electrode 33 in the trap.

The output of transistor amplifier 50 is coupled through capacitor 63, 2 μf, across resistor 64, 4700 ohms, to a diode detector 65, the output of which is filtered by capacitor 66, 10 μf, and resistors 67, 4700 ohms; 68, 10,000 ohms; 69, 33,000 ohms, and applied to the base of switching transistor 70, 2N3416. When the amplitude of the pulses conducted by transistor amplifier 50 indicate that liquid has reached the sensing electrode, transistor switch 70 conducts.

A relay 71 is connected in the collector circuit of transistor 70 with the positive terminal in the power supply and actuates a normally open contact 71a connected with the circuit of timer 72, which may be a Signetics NE/SE555 integrated circuit. The timing period for the timer is established by adjusting the resistance connected with timer terminal 72a. Potentiometer 73, 500,000 ohms, selects the time period during milking operation. Series connected potentiometer 74, one megohm, selects the time period during wash. The wash potentiometer is short circuited during the milking operation by switch section 56.

The connection of the timer illustrated in the drawing provides an established time period from the closing of relay contact 71a. An optional circuit, shown in broken lines, including a diode 76 and current limiting resistor 77 connected through the relay contact 71a between timer terminal 72a and negative power supply terminal 44, provides timer output from the closing of contact 71a with the timed period beginning at the opening of the relay contact. In some situations, this circuit operation may be preferred.

The output of timer 72 causes conduction of control transistor 80, 2N3416, which energizes a relay 81 to control Triac 82, operating pump motor 14.

We claim:

1. In a liquid handling system having a liquid receiving chamber with a liquid level sensing electrode extending downwardly therein, a liquid level sensing circuit comprising:
   a transistor amplifier having an emitter-collector output circuit and a base control element;
   a capacitor connected in series between said electrode and the base of said transistor;
   a source of alternating signal;
   a full wave diode bridge rectifier having an input and an output, the input connected to said alternating source and the output providing a DC operating potential for said transistor output circuit;
   a common electrical reference for the source of alternating signal and the liquid in the receiver;
   a circuit connected with said source through said electrode and the liquid in the receiver, and with said transistor base element to cause the transistor amplifier to conduct when liquid contacts said electrode;
   a sensitivity resistor connected in shunt with the base-emitter circuit of said transistor amplifier;
   a diode connected from said base to the DC output of said rectifier bridge, said sensitivity resistor being connected in parallel with said diode; and
   means responsive to conduction of said transistor to indicate the liquid level in the receiver.

2. The system of claim 1 in which said sensitivity resistor is adjustable.

3. The system of claim 1 in which said diode is connected in series with said electrode and in parallel with one section of said bridge rectifier.

4. The system of claim 3 including said capacitor in said base circuit which charges through said diode to cause said transistor to conduct, and which discharges through said sensitivity resistor.

5. The system of claim 1 including a current limiting resistor connected in series with said electrode and capacitor.

6. The system of claim 1 in which the means responsive to conduction of the transistor amplifier is a transistor switch.

7. The system of claim 6 including a detector circuit AC coupled to the output of said transistor amplifier for controlling operation of said transistor switch.

8. The system of claim 1 including a pump connected with said liquid receiving chamber and a timer connected with said liquid level sensing circuit and operable in response thereto, said timer having an output controlling said pump.

* * * * *